United States Patent [19]

Richer

[11] 4,394,101
[45] Jul. 19, 1983

[54] HEIGHT ADJUSTABLE CARGO CONTAINER LOCKING MECHANISM

[75] Inventor: John E. Richer, Oceanside, Calif.

[73] Assignee: The United States of America as represented by the Secretary of the Navy, Washington, D.C.

[21] Appl. No.: 225,883

[22] Filed: Jan. 19, 1981

[51] Int. Cl.³ .............................................. B60P 7/13
[52] U.S. Cl. ................................. 410/83; 24/221 R; 248/500; 403/348; 410/76; 410/77
[58] Field of Search .................................. 410/71–77, 410/82, 83, 107, 111; 248/499, 500, 503.1; 403/323, 348; 24/221 R, 221 K, 267

[56] References Cited

U.S. PATENT DOCUMENTS

| | | | |
|---|---|---|---|
| 3,389,663 | 6/1968 | Gutridge | 410/82 |
| 3,404,444 | 10/1968 | Isbrandtsen | 29/150 |
| 3,520,433 | 7/1970 | Blackburn | 414/498 |
| 3,521,845 | 7/1970 | Sweda et al. | 410/83 |
| 3,580,343 | 5/1971 | Hogue | 177/136 |
| 3,682,432 | 8/1972 | Lapaich | 410/83 |
| 3,701,562 | 10/1972 | Carr | 410/82 |
| 3,724,796 | 4/1973 | Hawkins et al. | 410/83 |
| 3,749,438 | 7/1973 | Loomis | 294/81 SF |
| 3,924,544 | 12/1975 | Grau | 410/78 |
| 4,321,000 | 3/1982 | Novak | 410/82 |

FOREIGN PATENT DOCUMENTS

| | | | |
|---|---|---|---|
| 984676 | 3/1976 | Canada | 410/82 |
| 1283795 | 8/1972 | United Kingdom | 410/83 |

*Primary Examiner*—Randolph Reese
*Attorney, Agent, or Firm*—Robert F. Beers; Ervin F. Johnston; Terrance A. Meador

[57] ABSTRACT

An apparatus for securing a cargo container having standard corner fittings includes a housing in which is mounted an elevator assembly for vertically positioning a platform with respect to the housing. The platform is adapted to engage a corner fitting when raised. The apparatus further includes a rotatable locking element carried on the platform which is rotated to lock to the fitting once the fitting is engaged. The platform together with the locking element can be further elevated when the fitting is engaged to raise a corner of the container or retracted within the housing to disengage and allow the container corner to clear the top of the housing.

15 Claims, 7 Drawing Figures

HEIGHT ADJUSTABLE CARGO CONTAINER LOCKING MECHANISM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein falls generally within the field of mechanisms for coupling and locking cargo containers by means of standard fittings on the containers. More particularly, the invention pertains to the field of twist locks for coupling and securing cargo containers having standard fittings. Even more particularly, the invention pertains to such mechanisms which are adjustable in height and which are adapted to lift a container as well as to secure it so that a raising force can be applied to the container at the fitting by the locking mechanism.

Shipping containers are widely employed in the portage industry to facilitate the handling, storing, and transporting of cargo. In order to secure the containers while they are being transported and to move them during handling, a number of methods and mechanisms have been developed.

One set of mechanisms includes a fitting of standard dimensions which is integrated into a cargo container at its corners to provide points of attachment for securing and lifting. Other mechanisms have been developed to provide a locking interface at the fittings. The most common of these locking mechanisms includes a retractable piece which may be inserted into an opening in the fitting after which a rotatable locking element is turned to provide a retaining force between the fitting and the mechanism.

Representative locking mechanisms with retractable twist locks are disclosed in U.S. Pat. No. 3,521,845, U.S. Pat. No. 3,701,562, U.S. Pat. No. 3,749,438 and U.S. Pat. No. 3,924,544. Such mechanisms comprise a shaped member for engaging a fitting opening and for resisting shear forces when the mechanism is in place. The shaped member generally is combined with a shank which carries a flange. Rotation of the shank to one position will cause the flange to contact an inner surface of the fitting to provide a retaining force; rotation to another position will allow the flange to clear the fitting opening and be retracted therefrom. A jack mechanism is provided for inserting the member and locking mechanism combination into the fitting opening and for withdrawing it therefrom. The locking mechanism is held at a position by means of a member which extends laterally from the shank to engage a restraining device at a distance from the shank.

In all of the prior art devices the locking mechanism has a single function: to provide an attachment interface for a container. None of the devices provides the added function of lifting a container which would be convenient when moving it with a forklift. All of the mechanisms described in the prior art provide for a vertical adjustment of the locking mechanism. However, this adjustment feature merely allows adaptation to fittings having different wall thicknesses. None of the prior art locking mechanisms provides a surface for supporting the container in the area of the fitting which can translate the vertical adjustment to a lifting force.

In addition, the mechanical structures of the prior art devices are broadened in a lateral direction in order to accommodate various latching assemblies. The result is a device which is larger than necessary to perform the attachment function.

SUMMARY OF THE INVENTION

The present invention provides a novel apparatus for locking to a cargo container having standard fittings at its corners. According to the invention, a platform included in the apparatus is employed to provide the ability to raise or lower a container while it is resting on a plurality of these apparatuses.

In an apparatus embodying the invention, a housing structure is fixedly disposed beneath the container to be adjacent to a fitting. An elevator is mounted within the housing. A platform is slidably contained within the housing structure and mounted on the elevator for being raised out of and lowered into the housing structure. The platform is adapted at one end to engage the adjacent fitting when it is raised out of the housing, and it is further adapted at the same end to support the container when the fitting is engaged. An elongated rotatable shaft is mounted on the platform and the elevator and has a locking element on its upper end which is carried on the platform. The lower end of the shaft is disposed beneath the elevator. The locking element is rotated with the shaft to lock to the fitting when the fitting is engaged. A securing mechanism is mounted on the lower end of the shaft. This securing mechanism is adapted to cooperate with the elevator to secure the shaft against rotation when the locking element locks to the fitting.

OBJECTS OF THE INVENTION

An important object of the present invention is to provide an improved mechanism for locking to a cargo container having standard corner fittings.

Another object is to provide a cargo container locking mechanism which can raise or lower the container while the container is resting on it.

Another object is to provide a mechanism of the type described above which has a compact, efficient design.

A further object is to provide a mechanism of the above type with a latching mechanism which does not expand the lateral profile of the apparatus.

These and other objects of the invention will become more readily apparent from the ensuing specification when taken together with the drawings.

DESCRIPTION OF THE PREFERRED EMBODIMENT

Figure 1:
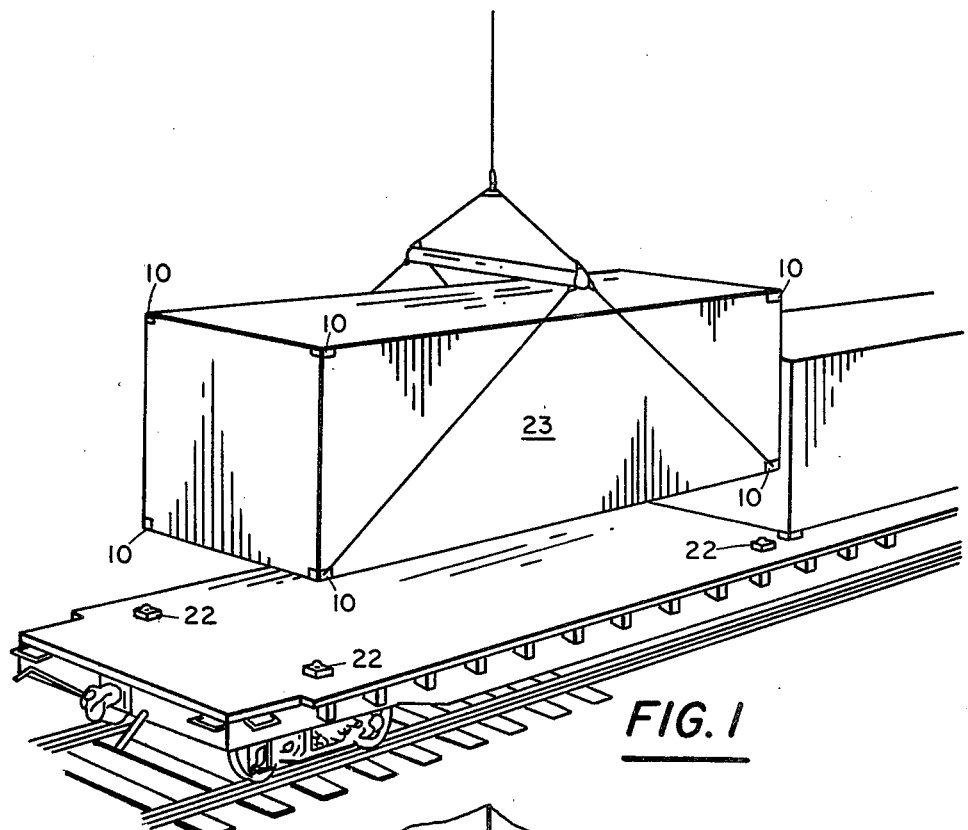
FIG. 1 is a perspective view of a container having standard corner fittings.

Referring now to the drawings and in particular to FIG. 1, an example of how standard fittings are used on cargo containers is shown. In FIG. 1, a standard cargo container 23 is fitted at each corner with a standard fitting 10. The fitting is used to secure the container to a carrying surface by locking mechanism 22. When the container 23 is to be carried on a surface, for example on the bed of a railway car, it is lowered to engage the locking mechanisms 22 by means of the corner fittings 10. When the container rests upon the locking mechanisms, the mechanisms are activated to lock to the fittings thereby securing the container to the carrying surface.

When the container is to be removed from the fittings, the locking mechanisms are unlocked and the container may be moved by a grappling mechanism which attaches to the fittings 10 by means of a grappling hook or clevis. The container 23 can also be moved by means of a lifting beam having attachment mechanisms which engage the container at the fittings 10 on its upper surface.

Figure 2A:
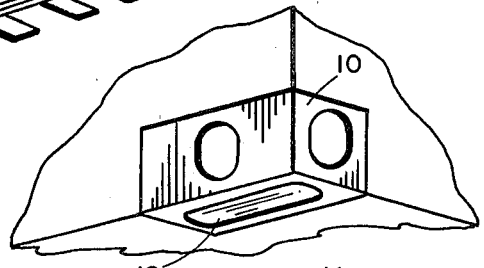
FIGS. 2a, 2b and 2c show a twist lock mechanism engaging a standard fitting.

In FIG. 2a a standard corner fitting 10 is illustrated together with a locking mechanism 22 having a locking element 11. The fitting 10 may, for example, be of a type specified by domestic or international standard organizations. For attachment of a container at the fitting, the locking element 11 inserts into the corner fitting 10 through a hole 12. When engaged in the hole 12, the locking element 11 is rotated from the unlocked position shown in FIG. 2b to the locked position shown in FIG. 2c. When this operation is repeated at all of the fittings 10 of the container to be carried, the container is secured to the container surface and may be transported thereon. To detach the container, each locking element 11 is rotated from the position shown in FIG. 2c to that shown in FIG. 2b. The container may then be lifted from the carrying surface.

Container cargo systems employing standard corner fittings and associated locking mechanisms cannot be easily moved from one carrying platform to another when an overhead crane is not available to lift them. One method employed to overcome this drawback is to provide a raised locking mechanism which allows lift forks to be inserted between the carrying surface and the bottom of the container. Such an approach is unsatisfactory because it leaves the locking mechanisms permanently raised above the plane of the carrying surface thereby making them vulnerable to damage from various shearing forces.

Figure 3:
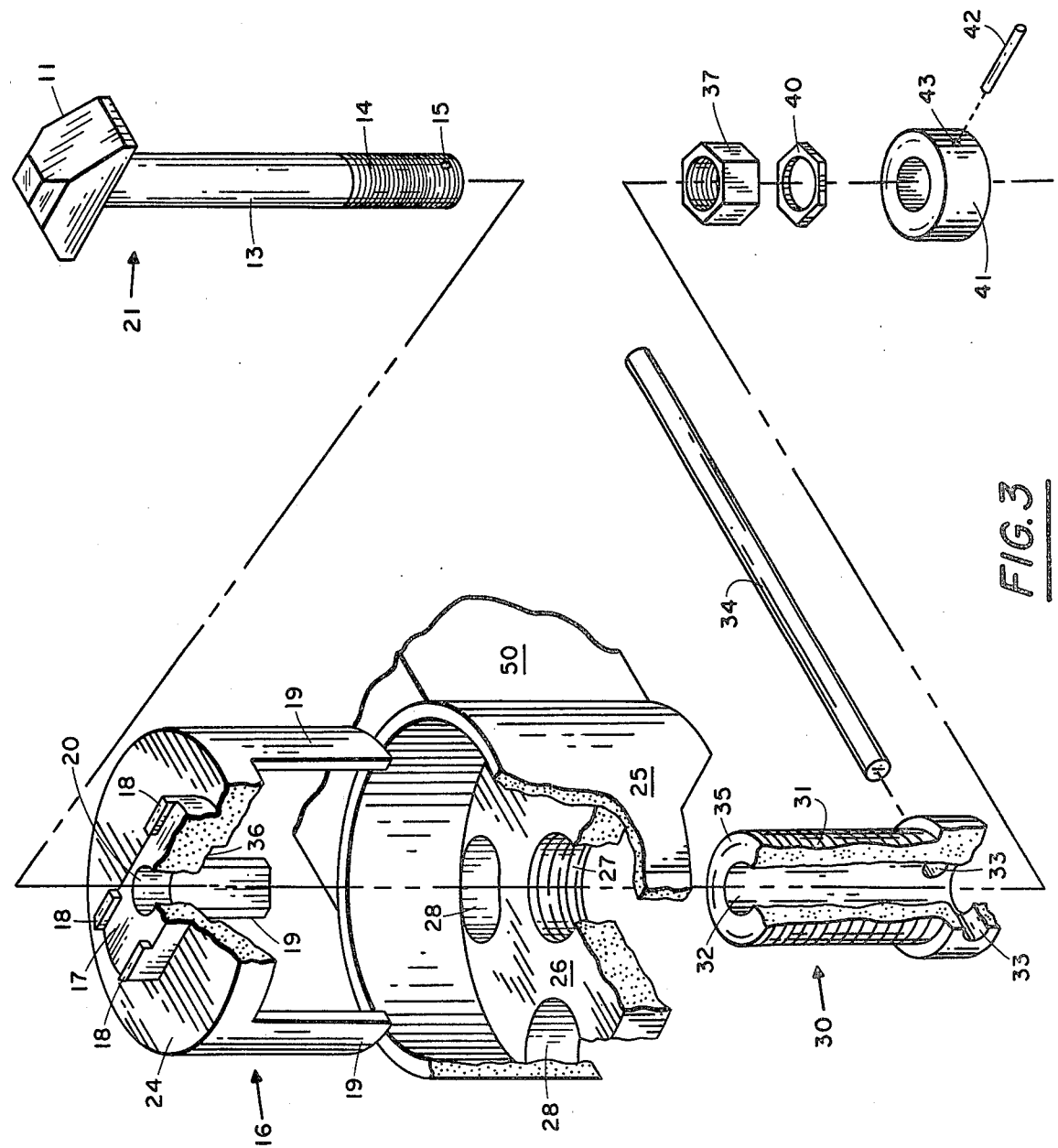
FIG. 3 is an exploded partial sectional view illustrating the elements of the invention.

In FIG. 3, a height adjustable locking mechanism is illustrated which can be retracted below the plane of the carrying surface when not engaged to a standard container fitting, and which may be raised when engagement is necessary, and which further provides the capability of raising the container to provide space between the carrying surface and the bottom of the container when a forklift must be employed to move the container. This novel apparatus also includes a unique arrangement to latch the mechanism in locking engagement with a corner fitting.

With reference now to FIG. 3, there is shown a platform 16 having four elongated legs 19, three of which are shown in the partial view. In addition, the platform 16 has an upper surface 24 adapted to engage the outer surface of a standard container fitting. Centered on the upper surface 24 of the platform 16 is a shear block 17 adapted to engage an opening in a standard corner fitting. The upper surface of the shear block 17 has, at each corner, a raised portion 18 intended for purposes described hereinbelow. A smooth central bore 20 is provided through the shear block 17 and carrying surface 24.

A housing 25 is adapted to slidably contain the platform 16. The housing is fixedly attached to the surface upon which the container is to be carried; it is positioned to be beneath a fitting when the container is placed on the surface. Intermediate the top and the bottom of the housing 25 is a stopper 26 which is attached at its periphery to the inner surface of the housing 25. Recesses 28 in the periphery of the stopper 26 provide spaces between the inner surface of the housing 25 and the stopper 26 for receiving and guiding the legs 19 of the platform 16. A threaded central bore 27 extends through the stopper 26 from its top surface to its bottom surface. The threaded bore 27 is of a larger diameter than the smooth bore 20 of the platform 16 and is coaxial with it when the housing and the platform are assembled.

A screw 30 is shown which has a threaded outer surface 31 and a smooth central bore 32. Four transverse bores 33, two of which are illustrated, are provided in the lower end of the screw 30. The outer diameter of the threaded surface 31 of the screw 30 allows the screw to threadably engage the stopper element 26 in its threaded central bore 27. The top surface 35 of the screw 30 contacts the underside of the surface 24 in a circular, countersunk recess 36.

When the platform 16, the housing 25, and the screw 30 are assembled, rotation of the screw in one direction will cause it to rise with respect to the housing and to carry with it the platform, thus elevating the platform to a raised position with respect to the housing. The elevating movement imparted to the platform 16 by the screw 30 is guided by cooperation between the legs 19 and the recesses 28 of the stopper 26. In the preferred embodiment, the relationship between the length of the threaded section 31 of the screw 30 and the length of the legs 19 of the platform 16 is such that the upper surface 24 and the shear block 17 of the platform 16 can be raised to a distance above the top of the housing 25.

Conversely, rotating the screw 30 in the opposite direction will cause the platform 16 to be lowered into the housing 25 where its downward travel is limited by the stopper 26. The screw may be rotated in either direction by means of the bar 34 when it is inserted into any of the holes 33.

When the platform 16, the housing 25, and the screw 30 are assembled, the bore 20 in the platform is coaxially aligned with the bore 32 of the screw 30. The two bores form a single, smooth central bore which extends through the platform and the screw.

A clamping mechanism 21 comprises an elongated shank 13 having a threaded lower surface 14 and a hole 15 bored laterally through the lower end of the shank. At the upper end of the shank 13 is attached a locking element 11. The diameter of the shank 13 allows it to be inserted through the bore formed by the central bore 20 in the platform 16 and the central bore 32 in the screw 30. When the shank is inserted through the central bores, the locking element 11 rests on the shear block 17 of the platform 16 thereby causing the clamping mechanism 21 to be carried by the platform 16. The configuration of the locking element 11 cooperates with the raised portions 18 of the shear block 17 to limit the placement of the locking element into one of two perpendicular positions on the shear block. The clamping mechanism can be rotated between the two perpendicular positions by raising it slightly and rotating it.

When the locking mechanism is assembled, threaded nut 37 engages the threaded portion 14 of the clamping mechanism and may be turned to contact the bottom portion of the screw 30 thereby forcing the locking element 11 against the shear block 17 and securing it against rotation in one of the two perpendicular positions. A threaded locknut 40 engages the threaded portion 14 of the clamping mechanism 21 beneath the nut 37 to provide a locking force. When the securing mechanism comprising the nut 37 and the locknut 40 is loosened, the clamping mechanism 21 can be rotated by means of the handle 41, which is attached to the lower end of the shank 13 by means of lockpin 42 which extends through the holes 43 and 15.

Figure 2B:
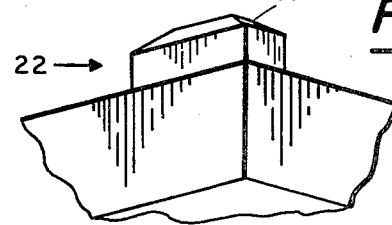
Figure 2B:
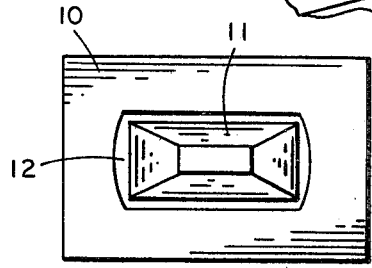
Figure 4:
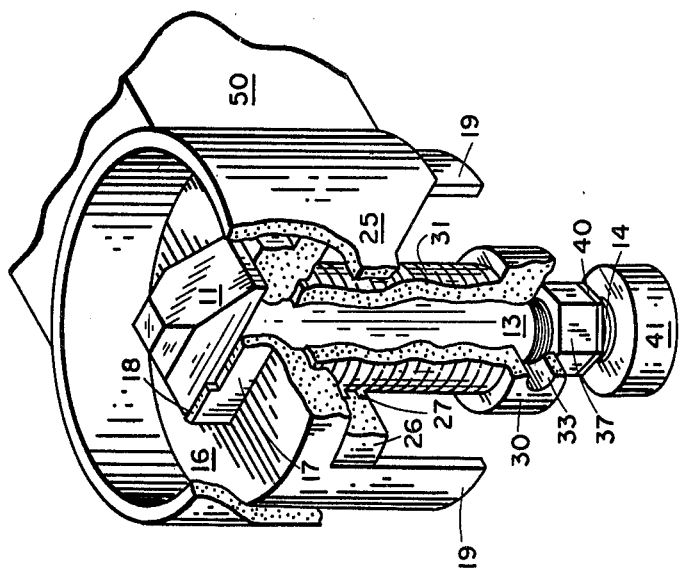
FIG. 4 is a partial sectional perspective view of the invention in a lowered non-locking position.
Figure 5:
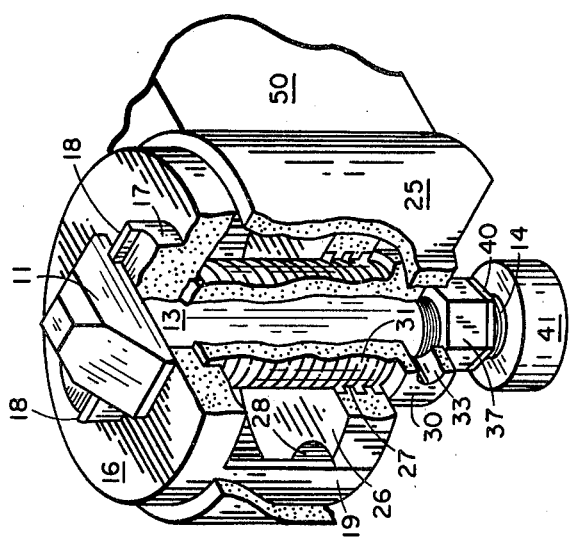
FIG. 5 is a partial sectional perspective view of the invention in a raised locking position.

Operation of the locking mechanism of the invention is illustrated in FIGS. 4 and 5. When the locking mechanism is not used, the screw 30 is rotated to lower the platform 16 into the housing 25 where it rests on the stopper 26. In this retracted position the shear block 17 and the locking element 11 are lowered into the housing 25 below the carrying surface 50 to which the housing is attached. In FIG. 4 the locking element is shown in one position aligned with the shear block 17 by the raised portions 18 which will allow the locking element and the shear block to be inserted into a hole in a corner fitting (as shown in FIG. 2b) when the screw 30 is turned in a direction to raise the platform 16. When the shear block 17 and the locking element 11 are fully engaged in a fitting cavity, the upper surface 24 of the platform 16 contacts the outer surface of the fitting and provides the locking mechanism with the capability of raising that corner of the container when the screw 30 is further rotated to elevate the platform 16.

Figure 2C:
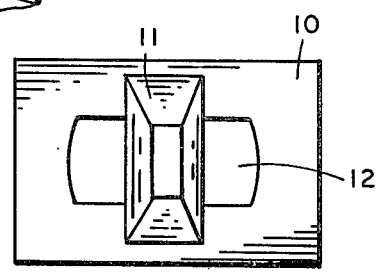

FIG. 5 shows the locking mechanism with the platform in an elevated position and the locking element rotated to a locking position transverse to the shear block 17. After a corner fitting is engaged by raising the platform to insert the shear block 17 and the aligned locking element 11 into a cavity, the locking element 11 is rotated by the handle 41 to the locking position defined by the raised elements 18 and is clamped to the inner surface of the fitting in that position (as shown in FIG. 2c). The clamping force is supplied by rotating the nut 37 and the locknut 40 to contact the bottom of the screw 30 thereby drawing the shank and the locking element downward. The locking element is thereby clamped to the inner surface of the engaged fitting.

Obviously, many modifications and variations of the present invention are possible in the light of the above teachings, and it is therefore understood that within the scope of the disclosed inventive concept, the invention may be practiced otherwise than as specifically described.

What is claimed is:

1. A locking mechanism for securing a cargo container having standard fittings, comprising:
   a housing fixedly disposed beneath the container and adjacent to a fitting;
   an elevator mounted within the housing;
   a platform slidably contained within the housing and mounted on the elevator for being raised out of and lowered into the housing, the surface area of the platform being of a size to permit one end of said platform to engage the bottom of the fitting when raised to an upward position and further adapted at the same end to support and raise the container when the fitting is engaged;
   an elongated rotatable clamping mechanism mounted on the platform and the elevator and having a locking element on its upper end which is carried on the platform, the locking element being rotated with the clamping mechanism to lock to the fitting when the fitting is engaged, the lower end of the clamping mechanism being disposed below the elevator; and
   a latching mechanism mounted on the clamping mechanism and adapted to cooperate with the elevator to secure the clamping mechanism against rotation when the locking element is locked to the fitting.

2. A locking mechanism as in claim 1 wherein the housing structure comprises:
   a cylindrical casing; and
   a stopper apparatus affixed to the interior surface of the casing, the stopper having a plurality of recesses radially spaced along its periphery and further having a threaded central bore.

3. A locking mechanism as in claim 2 wherein the platform comprises:
   a plurality of segments adapted to be slidably disposed within the stopper recesses; and
   an upper plate connecting the segments for contacting the container when the platform is raised and for resting on the stopper when the platform is lowered, the plate having a raised shear block portion adapted to be disposed within the fitting when the platform is raised, the shear block portion having a central bore which is coaxial with the central bore of the stopper when the platform is contained within the housing structure.

4. A locking mechanism as in claim 3 wherein the elevator comprises a threaded screw engaged in the threaded central bore of the stopper, the screw itself having a central bore which is coaxial with the central bore of the platform shear block when the screw is engaged in the stopper bore.

5. A locking mechanism as in claim 4 wherein the clamping mechanism comprises an elongated shank slidably disposed within the central bores of the screw and shear block, the shank being threaded at its lower portion with the threaded portion disposed below the screw.

6. A locking mechanism as in claim 5 wherein the locking element comprises a flange extending laterally from the top of the shank.

7. A locking mechanism as in claim 6 wherein the latching mechanism comprises a threaded nut disposed on the threaded portion of the shank, the but being advanced to contact the bottom of the screw to secure the shank against rotation.

8. A locking mechanism as in claim 7 further including a threaded locknut disposed on the threaded portion of the shank beneath the nut.

9. A locking mechanism as in claim 8 further including a handle for rotating the shank.

10. A locking mechanism for securing a cargo container having standard bottom located receptacle type fittings, comprising:
   a housing which is adapted to be disposed beneath a fitting of the container, the housing having a bottom and an open top;
   a platform slidably contained within the housing and adapted to be raised upwardly out of and lowered into the housing, the surface area of the platform being of a size to permit said platform to bear against the bottom of a respective fitting when in the upward position out of the housing;

elevator means for raising and lowering the platform;

a locking element mounted on top of the platform and adapted to be received within the container fitting;

means connected to the locking element and extending downwardly through the platform and downwardly through the housing for rotating the locking element within the fitting container.

11. A locking mechanism as claimed in claim 10 wherein the elevator means includes:

a screw which is threaded through the bottom of the housing and which has a top end which engages the bottom of the platform; and the screw having a lower end which is located below the bottom of the housing so that the screw can be selectively rotated in one direction or the other to raise and lower the platform.

12. A locking mechanism as claimed in claim 11 including:

the screw being tubular; and the locking element rotating means including an elongated shank rotatably extending through the tubular screw and having a bottom portion which extends below the bottom portion of the tubular screw for selectively rotating the locking element.

13. A locking mechanism as claimed in claim 12 including:

a nut threaded on the shank between the bottom portion of the shank and the bottom portion of the threaded screw for bearing against the bottom portion of the screw and thereby securing the position of the locking element relative to the screw.

14. A locking mechanism as claimed in claims 10, 11, 12, or 13 including:

means fixedly mounted on top of the platform for receiving and securely positioning the locking element in one of two positions, the two positions being 90° with respect to one another.

15. A locking mechanism as claimed in claims 10, 11, 12, or 13 including:

the bottom of the housing having openings; and the platform having downwardly extending segments which are received by the housing openings and which are reciprocable therein.

* * * * *